United States Patent [19]

Ryoke et al.

[11] Patent Number: 4,880,693
[45] Date of Patent: * Nov. 14, 1989

[54] MAGNETIC RECORDING MEDIUM

[75] Inventors: Katsumi Ryoke; Masatoshi Takahashi; Akihiro Hashimoto; Tsutomu Okita; Takashi Yoneyama, all of Kanagawa, Japan

[73] Assignee: Fuji Photo Film Co., Ltd., Kanagawa, Japan

[*] Notice: The portion of the term of this patent subsequent to Nov. 14, 2006 has been disclaimed.

[21] Appl. No.: 170,225

[22] Filed: Mar. 21, 1988

[30] Foreign Application Priority Data

Mar. 19, 1987 [JP] Japan .................. 62-62712

[51] Int. Cl.$^4$ .................................. G11B 5/64
[52] U.S. Cl. .................................. 428/323; 427/128; 428/694; 428/900
[58] Field of Search .............. 428/694, 900, 323; 427/128

[56] References Cited

U.S. PATENT DOCUMENTS

| | | | |
|---|---|---|---|
| 4,368,237 | 1/1983 | Yamada | 428/900 |
| 4,562,117 | 12/1985 | Kikukawa | 428/900 |
| 4,612,244 | 9/1986 | Kaneda | 428/900 |
| 4,649,072 | 3/1987 | Ryoke | 428/900 |
| 4,734,330 | 3/1988 | Oiyama | 428/411.1 |

Primary Examiner—Paul J. Thibodeau
Attorney, Agent, or Firm—Sughrue, Mion, Zinn, Macpeak & Seas

[57] ABSTRACT

A magnetic recording medium comprising a support having provided on one surface thereof a magnetic recording layer and on the other surface thereof a backing layer containing non-magnetic particles dispersed in a binder, wherein said binder comprises a vinyl chloride/vinyl acetate copolymer resin containing at least one group represented by formula (I) or (II):

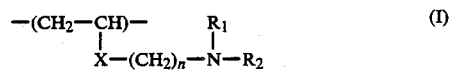

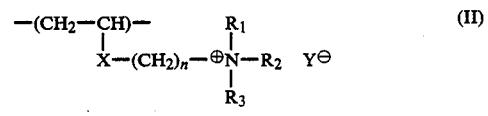

wherein X represents a —COO— group, a —CONH— group, or a —C$_6$H$_4$— group; n represents an integer of from 1 to 10; R$_1$, R$_2$, and R$_3$ each represents a hydrogen atom, an alkyl group having from 1 to 10 carbon atoms, or an alkyl derivative having from 1 to 10 carbon atoms, or R$_1$, R$_2$, and R$_3$ may be combined to each other to form a heterocycric ring; and Y$^\ominus$ represents a halogen atom, ClO$_4^\ominus$, or HgI$_3^\ominus$; or Y$^\ominus$ is bound to R$_2$, R$_2$ represents an alkylene group having from 1 to 10 carbon atoms, and Y$^\ominus$ represents a —COO$^\ominus$ group, an —SO$_3^\ominus$ group, or an —OSO$_3^\ominus$ group.

10 Claims, No Drawings

MAGNETIC RECORDING MEDIUM

FIELD OF THE INVENTION

The present invention relates to a magnetic recording medium, and more particularly it relates to a magnetic recording medium having excellent running durability and which is capable of reducing drop outs (DO).

The magnetic recording medium of the present invention can be used advantageously as a magnetic tape, a magnetic disk and a magnetic sheet.

BACKGROUND OF THE INVENTION

The magnetic recording media essentially comprise a support such as a polyester film having provided thereon a coated film (that is, a magnetic recording layer, which is hereinafter referred to as a recording layer) comprising ferromagnetic fine particles (such as $\gamma$-$Fe_2O_3$, $Fe_3O_4$, their modified iron oxide, or $CrO_2$) and at least one their modified iron oxide, or $CrO_2$) and at least one thermoplastic resin such as a vinyl chloride/vinyl acetate copolymer resin, a vinyl chloride/vinylidene chloride copolymer resin, cellulose type resins, acetal resins, urethane resins, or acrylonitrile butadiene copolymer type resins, and on the other surface of the support a backing layer comprising nonmagnetic particles and a binder comprising one or more thermoplastic resins. Such a backing layer is provided not only to improve the running properties of the magnetic recording medium (that is, running movement between the medium and a magnetic head for recording and reproduction) but also to provide the medium with antistatic property and, in some special cases, to provide the medium with a light-intercepting property. The objective in providing an antistatic property resides in reducing the attraction of foreign substances to the medium which takes place as a result of a build up of electric charges on the magnetic recording medium, causing drop outs. The objective in providing a light-intercepting property resides in reducing errors in the operation of an optical sensor which detects the end or the position of the recording area of a magnetic recording medium by sensing the light transmittance of the medium.

Conventionally, the binders used in the above described backing layer include, for example, a composition containing a vinyl chloride/vinyl acetate copolymer resin, a polyurethane resin, and a polyisocyanate. The binders having functional groups such as a PO(OM)$_2$ group, a OPO(OM)$_2$ group, a OP(OM)$_2$ group, an $SO_3M$ group, an $OSO_3M$ group, a COOH group, a COOM group, an OH group, a CONH group or the like (in which M represents a hydrogen atom, an alkyl group, an alkali metal atom, an ammonium group, and an amion group) introduced into the molecular chains of the above-described resins have been put into practical use in order to homogeneously disperse the non-magnetic particles in the backing layer (as described, e.g., in Japanese Patent Application (OPI) Nos. 59623/86, 172213/86, 133012/86, 133013/86, 172213/86, and 177524/83) (the term "OPI" used herein means a published unexamined Japanese patent application).

However, the dispersibility of non-magnetic particles in the backing layer using the above described resins as the binders is still insufficient. Therefore, there are problems which cause the surface properties of the backing layer to be inferior and which allow the backing layer is ready to be easily damaged and permit the powder to readily come off, thereby resulting in staining the parts of tape running system of a magnetic recording and reproducing device when the medium runs.

Further, there is also a tendency for drop outs to increase upon recording due to dust and contaminants which are formed by a magnetic layer, a backing layer, or a support undergoing damage or wear, and due to the consequent staining of tape running system.

Accordingly, a binder having such better dispersibility of non-magnetic particles has been desired to develop.

SUMMARY OF THE INVENTION

An object of the present invention is to provide a magnetic recording medium having excellent running durability and which is capable of reducing drop outs (DO) without the above-mentioned problems.

Other objects of the present invention will be apparent from the following description.

The present invention has overcome the abovementioned problems of the prior art magnetic recording media. The dispersibility of non-magnetic particles can be improved by using an amine-containing a vinyl chloride/vinyl acetate copolymer resin as a binder for the backing layer of the magnetic recording medium, thereby making the backing layer durable. As a result, the running durability of the magnetic recording medium can be improved and the drop outs can be reduced.

That is, the present invention relates to a magnetic recording medium comprising a support having provided on one surface thereof a magnetic layer and on the other surface thereof a backing layer containing nonmagnetic particles dispersed in a binder, wherein the binder comprises a vinyl chloride/vinyl acetate copolymer resin containing at least one group represented by formula (I) or (II):

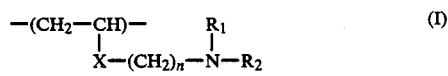

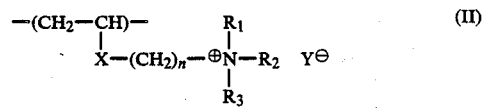

wherein X represents a —COO— group, a —CONH— group, or a —$C_6H_4$— group; n represents an integer of from 1 to 10; $R_1$, $R_2$, and $R_3$ each represents a hydrogen atom, an alkyl group having from 1 to 10 carbon atoms, or an alkyl derivative having from 1 to 10 carbon atoms, or $R_1$, $R_2$, and $R_3$ may be combined to each other to form a heterocyclic ring; and $Y^\ominus$ represents a halogen atom, $ClO_4^\ominus$, or $HgI_3^\ominus$; or $Y^\ominus$ is bound to $R_2$, $R_2$ represents an alkylene group having from 1 to 10 carbon atoms, and $Y^\Delta$ represents a —$COO^\ominus$ group, an —$SO_3^\ominus$ group, an —$OSO_3^\ominus$ group, etc.

DETAILED DESCRIPTION OF THE INVENTION

The present invention will be hereinafter illustrated in more detail.

The magnetic recording medium of the present invention essentially comprises a non-magnetic support having provided on one surface thereof a magnetic layer and on the other surface thereof a backing layer.

Examples of the support on which the backing layer and the magnetic layer are provided include polyesters such as polyethylene terephthalate or polyethylene naphthalate, polyolefin such as polypropylene, cellulose derivatives such as cellulose triacetate or cellulose diacetate, vinyl type resins such as polyvinyl chloride, other plastic films such as polycarbonate, polyamide resins or polysulfonic resins, metal materials such as aluminum or copper, and ceramics such as glass.

The support may be pre-treated by treatment such as a corona discharge treatment, a plazma treatment, an undercoating treatment, a heat treatment, a metal vapour deposition treatment, or an alkaline treatment.

The backing layer, which is the characteristic feature of the present invention, will be illustrated in more detail below.

The backing layer essentially comprises non-magnetic particles and a binder.

The non-magnetic particles are fine particles used as, e.g., a solid lubricating agent or an antistatic agent, preferably having an average particle size of 0.8 μm or less, more preferably 0.4 μm or less. Examples thereof include carbon black such as acetylene black, furnace carbon black, or thermal carbon black, and further include α-$Al_2O_3$, $Cr_2O_3$, $TiO_2$, $BaSO_4$, $CaCO_3$, $SiO_2$, talc, and graphite. Among these non-magnetic particles, carbon black is most preferably used in the present invention.

The binder which bonds the non-magnetic particles to form the backing layer is the most characteristic feature of the present invention, and comprises a vinyl chloride/vinyl acetate copolymer resin which contains at least one group represented by the above-described formula (I) or (II).

Preferably, X in formulae (I) and (II) represents a —COO— group or a —CONH— group; and $R_1$, $R_2$, and $R_3$ in formulae (I) and (II) each represents a hydrogen atom, an alkyl group having from 1 to 10 carbon atoms, or an alkyl derivative having from 1 to 10 carbon atoms, provided that $R_1$, $R_2$, and $R_3$ do not represent hydrogen atoms at the same time. $R_1$, $R_2$, and $R_3$ may be combined to each other to form a heterocycric ring.

The examples of the group represented by formula (I) or (II) are shown below.

—(CH$_2$—CH)—
  |
  COOCH$_2$NH$_2$

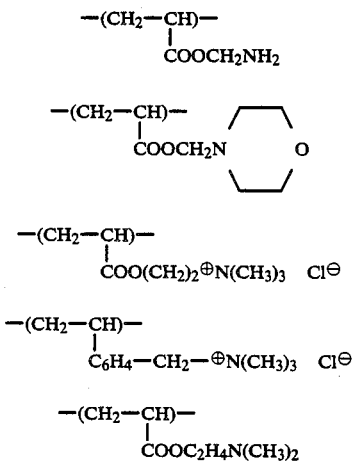

—(CH$_2$—CH)—
  |
  COO(CH$_2$)$_2$⊕N(CH$_3$)$_3$  Cl⊖

—(CH$_2$—CH)—
  |
  C$_6$H$_4$—CH$_2$—⊕N(CH$_3$)$_3$  Cl⊖

—(CH$_2$—CH)—
  |
  COOC$_2$H$_4$N(CH$_3$)$_2$

-continued

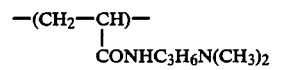

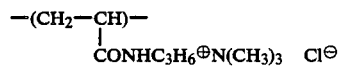

The method for preparing the above binders of the present invention, that is, the method for introducing the group represented by formula (I) or (II) into the vinyl chloride/vinyl acetate copolymer resin include, for example, directly introducing an amino group onto a OH group, a COOH group, a OCOCH$_3$ group, or a Cl atom in the molecule of the vinyl chloride/vinyl acetate copolymer resin using KOH, NaOH, NaOCH$_3$, or HCl as a catalyst schematically indicated below; and introducing an amine containing acrylate into the vinyl chloride/vinyl acetate copolymer resin by polymerizing.

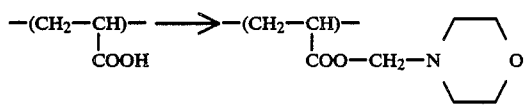

The above described methods are generally conducted by suspension polymerization, solution polymerization, emulsion polymerization, bulk polymerization or the like by using a polymerization initiator such as benzoyl peroxide, lauryl peroxide, azobisisobutyronitrile, etc. Amine modification is conducted when saponification is carried out in a solvent using an alkaline catalyst or an acid catalyst. These synthesis methods are known in the art and methods which can be applied to the preparation of the polymers used in the present invention are disclosed, for example, in *Enka Vinyl (Vinyl Chloride)*, by Masayuki Furuya, published by Nikkan Kogyo Press Co., Ltd.

Examples of the amine compounds used in these methods include a primary amine, a secondary amine, and a tertiary amine, and hetrocyclic amine such as an aliphatic amine, an alicyclic amine, an aromatic amine, or a heterocycric amine, and more specifically include ethylamine, propylamine, butylamine, cyclohexylamine ethanolamine, naphthylamine, aniline, o-toluidine, diethylamine, dioctylamine, diisobutylamine, diethanolamine, N-methylaniline, trimethylamine, triethylamine, triisobutylamine, tridecylamine, N-methyldiphenylamine, hexamethylene tetramine, triethanolamine, tributylamine, pyridine, α-picoline, β-picoline, γ-picoline, 2,4-lutidine, quinoline, and morpholine.

It is preferred that the amine-containing copolymer resin prepared by the above methods contains from 60 to 95 wt %, more preferably from 85 to 95 wt %, of a vinyl chloride unit, from 0 to 20 wt %, more preferably from 8.5 to 20 wt % of a vinyl acetate unit, and a small amount of other vinyl monomer if necessary based on the total amount of the resin. The amine content of the resin is preferably from 0.01 to 5 wt % in terms of the nitrogen content based on the total amount of the resin. The degree of polymerization of the amine containing resin is preferably from 100 to 700, more preferably from 150 to 500.

Examples of the vinyl monomer which can be used in the amine containing copolymer resin in a small amount include vinyl alcohl, a compound represented by formula:

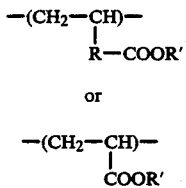

wherein R represents (CH$_2$)n (wherein n represents an integer of from 0 to 5); and R' represents a hydrogen atom or an alkyl group having from 1 to 5 carbon atoms. These monomers are preferably used in an amount of from 0 to 5 wt % based on the total amount of the resin.

When the amount of the vinyl chloride units is too small, the physical strength of the backing layer decreases, and when the amount thereof is too large, the solubility in solvents decreases, which is unfavorable for preparing a coating solution. When the amount of the vinyl acetate units is too small, the dispersibility of the non-magnetic particles decreases and the compatibility with polyurethane resins also decreases. On the other hand, when the amount of the vinyl acetate units is too large, both the physical strength and the heat-stability decreases.

When the amount of the amine-modified vinyl units is too small, both the dispersibility of the non-magnetic particles and the smoothness of the backing layer decrease. When the unit thereof is too large, both dispersibility and smoothness decrease and solubility also decreases, and thus the amine containing resin becomes unsuitable as a binder. When the average degree of polymerization of the above-described copolymer resin is too small, the physical strength of the backing layer decreases and the durability of the magnetic recording medium also decreases. On the other hand, when the average degree of polymerization is too large, the viscosity of the coating solution having a predetermined resin concentration is too high, which is unfavorable in view of handling the coating operation.

When the amine compound used for synthesizing the amine containing resin of the present invention is simply added to the compositions of the backing layer composed of non-magnetic particles and a conventional binder and dispersed therein to form a backing layer without causing a reaction, the dispersibility of the non-magnetic particles and the smoothness of the surface of the backing layer are slightly improved, but under these circumstances the dispersibility deteriorates with the passage of time. Therefore, the object of the present invention generally cannot be attained without reacting the amine with the resin.

When the above-described amine-modified resin is used as a binder, other binders may be used in combination therewith in an amount which is the same as or smaller than the amount of the amine-modified resin. Such binders include polyurethane resins, nitrocellulose, polyester resins, epoxy resins, polyamide resins, phenol resins, alkyl resins, polyvinyl butyral resins, and various polymer or copolymer resins such as polymers of acrylates, methacrylates, styrenes, acrylonitriles, butadienes, ethylenes, propylenes, or vinylidene chlorides. Particularly, polyurethane resins, epoxy resins, and nitrocelluloses are preferred.

It is desired that a polyisocyanate type hardening agent is used in addition to the above components. Suitable hardening agents include a polyfunctional isocyanate, a urethane prepolymer having isocyanate groups at both ends, and the like, which are available under the trade name of "Collonate L" "Collonate HL", "Collonate 2030", "Collonate 2031", "Collonate 2036", "Collonate 3015", "Collonate 2014", "Millionate MR", "Millionate MTL", "Dult Sec 1350", "Dult Sec 2170", and "Dult Sec 2280" manufactured by Nippon Polyurethane Industries Co., Ltd., and "Desmodule L" manufactured by Bayer Co., Ltd. in West Germany. The preferred additive amount of the hardening agent is from 5 to 40 parts by weight based on 100 parts by weight of a binder.

In the coating solution for forming a backing layer, the binder may be used in an amount of from 15 to 100 parts by weight based on 100 parts by weight of ferromagnetic particles.

In one embodiment of the present invention, based on the total weight of the binder, the amine containing resin may be included in the binder in an amount of from 10 to 60 wt %, a urethane resin or an epoxy resin may be included in the binder in an amount of from 10 to 90 wt %, a polyisocyanate may be included in the binder in an amount of from 5 to 40 wt %, and a polyamide may be included in the binder in an amount of from 0 to 50 wt %. It is particularly preferred that the amine containing resin is included in an amount of from 25 to 50 wt %, a urethane resins or epoxy resin is included in an amount of from 20 to 65 wt %, a polyisocyanate is included in an amount of from 10 to 35 wt %, and a polyamide is included in an amount of from 0 to 30 wt % in the composition of the binder.

The thickness of the coated layers of the magnetic recording medium should be as thin as possible to increase the recording density per unit volume of the medium and the thickness of the backing layer is preferably from 0.6 to 2.5 μm.

The backing layer is prepared by coating a coating solution having the above-described composition on the surface of a support opposite to the surface occupied by the magnetic layer, and drying it.

The coating solution for forming a backing layer is generally prepared by mixing the above described components, that is, dissolving the binder in a solvent which is capable of dissolving the desired binder, adding non-magnetic particles to the resulting binder solution, stirring and homogeneously dispersing the solution.

Examples of the solvents used for preparing the binder solution include ketone solvents such as acetone, methyl ethyl ketone, methyl isobutyl ketone, cyclohexanone, isophorone, or tetrahydrofuran; alcohol type solvents such as methanol, ethanol, propanol, butanol, isobutyl alcohol, isopropyl alcohol, or methyl hexanol; ester type solvents such as methyl acetate, ethyl acetate, butyl acetate, isobutyl acetate, isopropyl acetate, ethyl lactate, or monoethyl ether of glycol acetate; glycol ether type solvents such as ether, glycol dimethyl ether, glycol monomethyl ether, or dioxane; aromatic hydrocarbon type solvents such as benzene, toluene, xylene, cresol, chlorobenzene, or styrene; chlorinated hydrocarbon type solvents such as methylene chloride, ethylene chloride, carbon tetrachloride, chloroform, ethylene chlorohydrin, or dichlorobenzene; N,N-dimethylformamide; and hexane; etc.

The solvents are selected so as to completely dissolve the ingredients which should be dissolved. When those solvents are used in combination, the amounts of each solvent are optionally selected. The solvents should be selected so that they do not deteriorate the desired characteristics of the ferromagnetic particles.

A two-roll mill, a three roll mill, a ball mill, a pebble mill, a tron mill, sand grinder, an attritor, a high speed impeller, a dispersing device, a high speed stone mill, a high speed impact mill, a disper, a kneader, a high speed mixer, a ribbon blender, a cokneader, an intensible mixer, a tumbler, a blender, a disperser, a homogenizer, an ultrasonic dispersing device or the like may be used for dissolving and dispersing the components in the solvent.

After the dispersing step, the coating solution for the backing layer is coated on a support by various coating methods such as, for example, an air doctor coating method, a blade coating method, an air knife coating method, a squeeze coating method an impregnating method, a reverse roll coating method, a transfer roll coating method, a gravure coating method, a cast coating method, or a spray coating method in such an amount that the dry thickness of the backing layer is from 0.6 to 2.5 μm.

After the coating solution for the backing layer is coated on a support, it is dried by a conventional drying apparatus, using a conventional technology.

A magnetic layer is provided on the surface of the non-magnetic support opposite the surface occupied by the backing layer.

One approach to preparing a magnetic layer comprises dispersing ferromagnetic particles in a binder solution, coating the resulting solution on a support, providing magnetic orientation and drying it, and the other approach comprises forming a magnetic layer by vacuum deposition in a magnetic field. Either approach can be used in the preparation of the magnetic recording medium according to the present invention.

Examples of the ferromagnetic particles used in the former approach include $\gamma\text{-}Fe_2O_3$, Co-containing $\gamma\text{-}Fe_2O_3$, $Fe_3O_4$, Co-containing $Fe_3O_4$, $\gamma\text{-}FeOx$ ($1.33 < x \leq 1.50$), Co-containing $\gamma\text{-}FeOx$ ($1.33 < x \leq 1.50$), $CrO_2$, Co-Ni-P alloy, Co-Ni-Fe alloy, Fe-Ni-Zn alloy, Ni-Co alloy, Co-Ni-Fe-Be alloy and a plate like hexagonal barium ferrite. The ferromagnetic particles have an average particle size of from about 0.005 to 2 μm, a ratio of long axis/axis width of from 1/1 to 50/1, and a specific surface area of from 1 to 70 $m^2/g$. Prior to dispersion, dispersing agents, lubricating agents and antistatic agents may be absorbed on the surface of ferromagnetic particles by impregnating ferromagnetic particles in a solvent.

The binders used for bonding the ferromagnetic particles to form a magnetic layer may be the same as those used for the backing layer.

In addition to the above described ferromagnetic particles and binders, additives such as lubricating agents, abrasive agents, dispersing agents, antistatic agents or rust preventing agents can be added to the coating solution for a magnetic layer.

Examples of the lubricating agents include saturated or unsaturated higher fatty acids, fatty acid esters, higher fatty acid amides, higher alcohols and silicon oil, graphite, molybdenum disulfide, tungsten disulfide, boron nitride, fluorinated graphite, alcohol fluoride, polyolefin, polyglycol, alkyl phosphate, polyphenyl ether, fatty acid, fatty acid ester and fatty acid alcohols. These lubricating agents may be used in an amount of from 0.05 to 20 parts by weight based on 100 parts by weight of the binder.

Examples of the abrasive agents include α-alumina, fused alumina, chromium oxide, corundum, α-iron oxide, silicon nitride, boron nitride, silicon carbide, molybdenum carbide, boron carbide, tungsten carbide, diatom earth, and dolomite which have a Moh's hardness of 6 or more and an average particle size of from 0.005 to 5 L μm. These abrasive agents may be used alone or in combination and are used in an amount of from 0.01 to 20 parts by weight based on 100 parts by weight of the binder.

Examples of the dispersing agents include fatty acids having from 10 to 22 carbon atoms such as caprylic acid, capric acid, lauric acid, myristic acid, palmitic acid, stearic acid, oleic acid, elaidic acid, linolic acid, linolenic acid and stearolic acid, alkali metals or alkali earth metal salts of those fatty acids, metal soaps such as copper or lead soap, lecithin, higher alcohol, and sulfate or phosphates of higher alcohol. These dispersing agents may be used alone or in combination and may be used in an amount of from 0.005 to 20 parts by weight based on 100 parts by weight of the binder.

Examples of the antistatic agents include electroconductive particles such as graphite, carbon black or carbon black graphite polymer, natural surface active agents such as saponin, nonionic surface active agents such as alkylene oxide type agents, glycerine type agents, glycidol type agents, polyhydric alcohol type agents or polyhydric alcohol esters, cationic surface active agents such as higher alkyl amine, cyclic amine, hidantoin derivatives, amide amines, ester amides, quaternary ammonium salts, pyridine, other heterocyclic rings, phosphoniums or sulphoniums, anionic surface active agents such as carboxylic acid, sulfonic acids, phosphoric acid or agents having an acid group such as a sulfuric acid ester group or a phosphoric acid ester group and amphoteric surface active agents such as amino acids, aminosulfonic acids, sulfonic acid ester of aminoalcohol or alkylbetain type agents. These surface active agents may be used alone or in combination and may be used in an amount of from 0.01 to 10 parts by weight based on 100 parts by weight of ferromagnetic particles. These antistatic agents may be used, in some cases, to improve dispersibility and magnetic properties, as well as to improve lubricating properties or as a coating aid, in addition to the above described purposes.

The coating solution for a magnetic layer is prepared basically by dissolving the desired binder in a solvent which is capable of dissolving the binder, adding ferromagnetic particles together with the above described components to the resulting solution, stirring and homogeneously dispersing the solution. The solvent used therein may be the same as that used for preparing a coating solution for a backing layer.

The thus prepared coating solution may be coated by the same method as that for coating a backing layer using the same apparatus as used for preparing a backing layer, and dried to obtain a magnetic layer.

The magnetic layer thus coated on a support is generally subjected to magnetic orientation while drying, so that the ferromagnetic particles contained in the magnetic layer will have an orientation after the magnetic layer is completely dried. Technologies for coating, drying and magnetic orientation of a magnetic layer are conventional technologies and can be applied to prepare a magnetic recording medium according to the present invention.

The above-described various additives may be coated or sprayed on the surface of a magnetic layer in an organic solvent solution or a dispersion after a magnetic layer is dried.

A magnetic layer can be also prepared by vacuum deposition in a magnetic field. The ferromagnetic particles used for preparing such a magnetic layer include metals such as Fe, Co, or Ni and ferromagnetic alloys such as Fe—Co, Fe—Ni, Co—Ni, Fe—Co—Ni, Fe—Rh, Fe—Cu, Co—Cu, Co—Au, Co—Y, Co—La, Co—Pr, Co—Gd, Co—Sm, Co—Pt, Ni—Cu, Mn—Bi, Mn—Sb, Mn—Al, Fe—Or, Co—Or, Ni—Or, Fe—Co—Cr, Ni—Co—Or, Fe—Co—Ni—Cr, etc. More specifically, such a magnetic layer prepared by vacuum deposition in a magnetic field is disclosed, for example, in Japanese Patent Application (OPI) Nos. 22265/84 and 17544/83 and U.S. Pat. 3,342,635 and 3,342,634.

The order in which the magnetic layer and the backing layer are provided on a support may be optionally determined by those skilled in this art. In any case, it is believed that the magnetic recording medium of the present invention can easily be prepared by those skilled in this industry using conventional techniques.

The present invention will be illustrated in more detail by the following Examples and Comparative Examples. In Examples and Comparative Examples, all parts are by

EXAMPLE 1

A coating solution for a magnetic layer having the following composition was coated on a polyethylene terephthalate film having a 20 μm thickness, subjected to magnetic orientation using cobalt magnets and dried at a temperature of from 20 to 100° C. for 15 seconds to obtain a magnetic layer having a 6 μm thickness.

Preparation of a coating solution for a magnetic layer

Composition:

| | |
|---|---|
| Co-containing γ-Fe₂O₃ particles nitrogen absorbing specific surface area 40 m²/g, coercive force Hc = 850 Oe) | 300 parts |
| Vinyl chloride/vinyl acetate copolymer resin "VMCH" (a trade name manufactured by Union Carbide Co., Ltd.) | 40 parts |
| Polyurethane resin "Nipporan N-2304" (a trade name, manufactured by Nippon Polyurethane Co., Ltd. | 20 parts |
| Carbon black "Vulcan XC 72" (a trade name, manufactured by Cabot Co., Ltd. average particle size: 30 m μ) | 16 parts |
| Octyl laurate | 3 parts |
| Lauric acid | 1.5 parts |
| Butyl acetate | 600 parts |
| Methyl ethyl ketone | 300 parts |

The above-described components were each put in a ball mill and were sufficiently mixed and dispersed, and thereafter 20 parts of polyisocyanate compound "Desmodule L-75" (a trade name, manufactured by Bayer Co., Ltd. in West Germany) was added thereto and further mixed and dispersed to prepare a coating solution for a magnetic layer. On the other hand, a coating solution for a backing layer having the following composition was coated on a surface of a support opposite to the surface occupied by magnetic layer and was dried at a temperature of from 20° to 100° C. for 15 seconds to obtain a backing layer having a 2 μm thickness.

Coating solution for a backing layer:

Composition:

| | |
|---|---|
| Carbon black "Conductex XC" (a trade name, manufactured by Columbian Co., Ltd. average particle size 20 m μ) | 100 parts |
| Polyurethane resin "Nipporan N-2304" (a trade name, manufactured by Nippon Polyurethane Co., Ltd.) | 20 parts |
| Amine-containing vinyl chloride/vinyl acetate copolymer resin (vinyl chloride unit: 86 wt %, vinyl acetate unit: 13 wt %, amine-containing vinyl group: 0.05 wt %, degree of polymerization 400) | 30 parts |
| Copper oleate | 0.1 part |
| Methyl ethyl ketone | 1,000 parts |

The above composition was mixed, kneaded and dispersed in a ball mill and then 15 parts of polyisocyanate 37 Collonate 2061" (a trade name, manufactured by Nippon Polyurethane Co., Ltd.) was added thereto and further uniformly mixed and dispersed to obtain a coating solution for a backing layer.

Then, the resulting magnetic layer was subjected to a calendering treatment and slit to a 1 inch width to obtain a magnetic tape, which was identified as Sample A.

COMPARATIVE EXAMPLE 1

The same procedure as in Example 1 was repeated to obtain a magnetic tape except that instead of the vinyl chloride/vinyl acetate coplymer resin in the coating solution for preparing the backing layer used in Example 1, a polyvinylidene chloride resin 37 Saran" (a trade name, manufactured by Asahi Dow Chemical Co., Ltd.) was used. The magnetic tape thus obtained was identified as Comparative Sample No. 1.

COMPARATIVE EXAMPLE 2

The same procedure as in Example 1 was repeated to obtain a magnetic tape except tat nitrocellulose was used instead of the amine-containing vinyl chloride/vinyl acetate copolymer resin in the coating solution for preparing the backing layer so as to prepare Comparative Sample No. 2.

COMPARATIVE EXAMPLE 3

The same procedure as in Example 1 was repeated to obtain a magnetic tape, except that a maleic acid-containing vinyl chloride/vinyl acetate copolymer resin was used instead of the amine-containing vinyl chloride/vinyl acetate copolymer resin in the coating solution for the preparation of the backing layer in Example 1. The thus obtained tape was identified as Comparative Sample No. 3.

COMPARATIVE EXAMPLE 4

The same procedure as in Example 1 was repeated to obtain a magnetic tape, except that 50 parts of sulfonic acid-containing polyurethane resin having high Tg 37 UR-8200 (a trade name, manufactured by TOYOBO CO., LTD.) was used instead of 40 parts of amine-containing vinyl chloride/vinyl acetate copolymer resin used in the coating solution for the preparation of the backing layer in Comparative Example 1. The thus obtained tape was identified as Comparative Sample No. 4.

The thus obtained tapes were evaluated and the results are shown in Table 1.

Measuring Method:

(1) Gloss of the surface of the backing layer:
Gloss was measured based on "JIS-Z 8741" and shown in terms of relative values when the gloss of a surface of a glass having a refractive index of 1.567 at an angle of coincidence of 45° is 100%.

(2) Screen chroma noise:
Screen signals of image signals 30 IRE superimposed with carrier waves amplitude of 100% were recorded at a standard recording current. These signals were reproduced through a high frequency filter of 1 kHz and a low frequency filter of 500 kHz and the AM component of the chroma noise in the reproduced signals was measured using a noise measuring device. The screen chroma noise of the samples is shown in terms of relative decibel (dB) values when the chroma noise of Sample 1 of the present invention is a standard dB value.

(3) Drop Out:
Drop out is shown by the number of drop outs per minute which occurred after the repeated usage of 10 passes. Drop out was counted by a drop out counter when the reproduced output level decreased by 16 dB or more for $5 \times 10^{-6}$ sec or more.

TABLE 1

| Samples | Gloss | Chroma noise (dB) | Number of drop out |
|---|---|---|---|
| Example 1 Sample A | 2.0 | 0 (standard) | 30 |
| Comparative Sample No. 1 | 1.5 | 0 | 210 |
| Comparative Sample No. 2 | 1.5 | −0.3 | 130 |
| Comparative Sample No. 3 | 1.5 | 0 | 180 |
| Comparative Sample No. 4 | 2.0 | −0.1 | 360 |

As is clearly shown by the results in Table 1, Sample A of the present invention exhibits a good drop out rate as well as achieving a low level of noise. On the other hand, Comparative Samples 1 through 4 exhibit not only an inferior drop out rate, but also has an inferior noise level with regard to the use of other functional groups, Sample A having an amino group is particularly excellent when compared with Comparative Sample No. 4 having a sulfonic acid group.

The binder used in the backing layer of the magnetic recording medium of the present invention exhibits excellent dispersibility of the non-magnetic particles used therein. The magnetic recording medium of the present invention has much better durability and a reduced number of drop outs, and therefore, is very effective as a recording medium for high density recording.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a support having provided on one surface thereof a magnetic recording layer and on the other surface thereof a backing layer containing non-magnetic particles dispersed in a binder, wherein said binder comprises a vinyl chloride/vinyl acetate copolymer resin containing at least one group represented by formula (I) or (II):

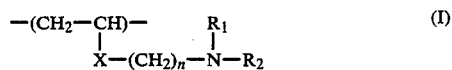

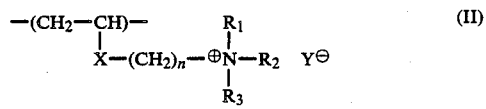

wherein X represents a —COO— group, a —CONH— group, or a —C$_6$H$_4$—group; n represents an integer of from 1 to 10; R$_1$, R$_2$, and R$_3$ each represents a hydrogen atom, an alkyl group having from 1 to 10 carbon atoms, or an alkyl derivative having from 1 to 10 carbon atoms, or R$_1$, R$_2$ and R$_3$ may be combined to each other to form a heterocyclic ring; and Y$^\beta$ represents a halogen atom, ClO$_4{}^\ominus$, or HgI$_3{}^\ominus$; or Y$^\ominus$ is bound to R$_2$, R$_2$ represents an alkylene group having from 1 to 10 carbon atoms, and Y$^\ominus$ represents a —COO$^\ominus$ group, an —SO$_3{}^\ominus$ group, or an —OSO$_3{}^\ominus$ group; and wherein said copolymer resin contains from 60 to 95 wt % of a vinyl chloride unit and greater than 0 wt % of a vinyl acetate unit based on the total amount of said polymer r(R)sin; and wherein the amine content of said copolymer resin is from 0.01 to 4 wt % in terms of the nitrogen content based on the total amount of said copolymer resin; and wherein said copolymer resin has a degree of polymerization of from 100 to 700.

2. A magnetic recording medium as claimed in claim 1, wherein X represents a -COO- group or a -CONH— group; and R$_1$, R$_2$, and R$_3$ each represents a hydrogen atom, an alkyl group having from 1 to 10 carbon atoms, or an alkyl derivative having from 1 to 10 carbon atoms, provided that R$_1$, R$_2$, and R$_3$ do not represent hydrogen atoms at the same time, or R$_1$, R$_2$, and R$_3$ may be combined to each other to form a heterocyclic ring.

3. A magnetic recording medium as claimed in claim 1, wherein said copolymer resin contains from 85 to 95 wt % of a vinyl chloride unit and from 8.5 to 20 wt % of a vinyl acetate unit based on the total amount of said copolymer resin.

4. A magnetic recording medium as claimed in claim 1, wherein said copolymer resin has a degree of polymerization of from 150 to 500.

5. A magnetic recording medium as claimed in claim 1, wherein said binder comprises from 10 to 60 wt % of said copolymer resin, from 10 to 90 wt %, of a urethane resin or an epoxy resin, from 5 to 50 wt % of a polyisocyanate, and from 0 to 50 wt % of polyamide.

6. A magnetic recording medium as claimed in claim 5, wherein said binder comprises from 25 to 50 wt % of said copolymer resin, from 20 to 65 wt %, of a urethane resin or an epoxy resin, from 10 to 35 wt % of a polyisocyanate, and from 0 to 30 wt % of a polyamide.

7. A magnetic recording medium as claimed in claim 1, wherein the thickness of said backing layer is from 0.6 to 2.5 μm.

8. A magnetic recording medium as cliamed in claim 1, wherein said non-magnetic particles have an average particle size of 0.8 μm or less.

9. A magnetic recording medium as claimed in claim 8, wherein said non-magnetic particles have an average particle size of 0.4 μm or less.

10. A magnetic recording medium as claimed in claim 1, wherein said non-magnetic particles are carbon black.

* * * * *

UNITED STATES PATENT AND TRADEMARK OFFICE
CERTIFICATE OF CORRECTION

PATENT NO. : 4,880,693

DATED : November 14, 1989

INVENTOR(S) : Katsumi Ryoke et al

It is certified that error appears in the above-identified patent and that said Letters Patent is hereby corrected as shown below:

Column 12, line 18, change "$Y^{\beta}$" to --$Y^{\ominus}$--.

Column 12, line 25, change "r ®  sin" to --resin--.

Signed and Sealed this

Twenty-eighth Day of May, 1991

Attest:

HARRY F. MANBECK, JR.

Attesting Officer

Commissioner of Patents and Trademarks